(12) United States Patent
Hofmann et al.

(10) Patent No.: US 10,239,995 B2
(45) Date of Patent: Mar. 26, 2019

(54) PROCESS FOR PREPARING POLYETHER CARBONATE POLYOLS

(71) Applicant: Covestro Deutschland AG, Leverkusen (DE)

(72) Inventors: Jörg Hofmann, Krefeld (DE); Thomas Ernst Müller, Aachen (DE); Michael Pohl, Aachen (DE); Walter Leitner, Aachen (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 0 days.

(21) Appl. No.: 15/545,359

(22) PCT Filed: Jan. 27, 2016

(86) PCT No.: PCT/EP2016/051611
§ 371 (c)(1),
(2) Date: Jul. 21, 2017

(87) PCT Pub. No.: WO2016/120289
PCT Pub. Date: Aug. 4, 2016

(65) Prior Publication Data
US 2018/0009941 A1   Jan. 11, 2018

(30) Foreign Application Priority Data
Jan. 28, 2015 (EP) .................................. 15152830

(51) Int. Cl.
*C08G 64/34* (2006.01)
*C08G 64/42* (2006.01)
*C08G 65/26* (2006.01)

(52) U.S. Cl.
CPC ............. *C08G 64/34* (2013.01); *C08G 64/42* (2013.01); *C08G 65/2603* (2013.01); *C08G 65/2663* (2013.01)

(58) Field of Classification Search
CPC ......... C08G 64/34; C08G 64/42; C08G 65/26
See application file for complete search history.

(56) References Cited

U.S. PATENT DOCUMENTS

| 3,404,109 A | 10/1968 | Milgrom |
| 3,829,505 A | 8/1974 | Herold |
| 3,941,849 A | 3/1976 | Herold |
| 4,145,525 A | 3/1979 | Dixon et al. |
| 4,826,953 A | 5/1989 | Kuyper et al. |
| 5,158,922 A | 10/1992 | Hinney et al. |
| 5,470,813 A | 11/1995 | Le-Khac |
| 5,536,883 A | 7/1996 | Le-Khac |
| 5,637,673 A | 6/1997 | Le-Khac |
| 5,714,428 A | 2/1998 | Le-Khac |
| 5,789,626 A | 8/1998 | Le-Khac |
| 6,018,017 A | 1/2000 | Le-Khac |
| 6,780,813 B1 | 8/2004 | Hofmann et al. |
| 6,835,687 B2 | 12/2004 | Hofmann et al. |
| 7,008,900 B1 | 3/2006 | Hofmann et al. |
| 7,304,172 B2 | 12/2007 | Coates et al. |
| 8,324,419 B2 | 12/2012 | Mijolovic et al. |
| 9,012,675 B2 * | 4/2015 | Allen ................. C08G 64/34 528/260 |
| 9,273,183 B2 | 3/2016 | Müller et al. |
| 9,676,905 B2 | 6/2017 | Müller et al. |
| 10,125,217 B2 * | 11/2018 | Hofmann ............... C08G 64/34 |
| 2012/0165549 A1 | 6/2012 | Ok et al. |
| 2014/0107245 A1 | 4/2014 | Hofmann et al. |

FOREIGN PATENT DOCUMENTS

| JP | 041345123 A | 5/1992 |
| WO | 03029325 A1 | 4/2003 |

OTHER PUBLICATIONS

Inoue, S. et al; "Copolymerization of Carbon Dioxide and Epoxide with Organometallic Compounds"; Die Makromolekulare Chemie 130; (1969); pp. 210-220 (Nr. 3170); Tokyo, Japan.
Zhang, Xing-Hong et al; "Atom-Exchange Coordination Polymerization of Carbon Disulfide and Propylene Oxide by a Highly Effective Double-Metal Cyanide Complex" Macromolecules 2008; 41; pp. 1587-1509; 2008 American Chemical Society; Published on Web Feb. 14, 2008.
Allen, Scott D. et al; "High-Activity, Single-Site Catalysts for the Alternating Copolymerization of CO2 and Propylene Oxide"; Journal of American Chemical Society; (2002); 124 (48); pp. 14284-14285; Publication Date (Web): Nov. 8, 2002; Ithaca, New York.
Kember, Michael R. et al; "Catalysts for CO2/epoxide copolymerisation"; ChemComm; (2011); 47; pp. 141-163; The Royal Society of Chemistry; London.

* cited by examiner

*Primary Examiner* — Sun Jae Yoo
(74) *Attorney, Agent, or Firm* — N. Denise Brown

(57) ABSTRACT

The invention provides a process for preparing polyether carbonate polyols by addition of alkylene oxides and carbon dioxide onto H-functional starter substance in the presence of a double metal cyanide (DMC) catalyst or in the presence of a metal complex catalyst based on the metals zinc and/or cobalt, wherein (γ) alkylene oxide and carbon dioxide are added onto H-functional starter substance in a reactor in the presence of a double metal cyanide catalyst or in the presence of a metal complex catalyst based on the metals zinc and/or cobalt, wherein a reaction mixture comprising the polyether carbonate polyol is obtained, and wherein (δ) the reaction mixture obtained in step (γ) remains in the reactor or is transferred continuously into a postreactor, wherein the content of free alkylene oxide in the reaction mixture is reduced in each case in the manner of a postreaction, characterized in that a component K is added during the postreaction, component K being selected from at least one compound containing a phosphorus-oxygen-hydrogen group.

15 Claims, No Drawings

PROCESS FOR PREPARING POLYETHER CARBONATE POLYOLS

CROSS-REFERENCE TO RELATED APPLICATIONS

This Application is a National Phase Application of PCT/EP2016/051611, filed Jan. 27, 2016, which claims priority to European Application No. 15152830.4, filed Jan. 28, 2015, each of which being incorporated herein by reference.

FIELD

The present invention relates to a process for preparing polyether carbonate polyols by catalytic copolymerization of carbon dioxide ($CO_2$) with alkylene oxides in the presence of H-functional starter substance.

BACKGROUND

The preparation of polyether carbonate polyols by catalytic reaction of alkylene oxides (epoxides) and carbon dioxide in the presence of H-functional starter substances ("starters") has been the subject of intensive study for more than 40 years (e.g. Inoue et al., Copolymerization of Carbon Dioxide and Epoxide with Organometallic Compounds; Die Makromolekulare Chemie 130, 210-220, 1969). This reaction is shown in schematic form in scheme (I), where R is an organic radical such as alkyl, alkylaryl or aryl, each of which may also contain heteroatoms, for example O, S, Si etc., and where e, f and g are integers, and where the product shown here in scheme (I) for the polyether carbonate polyol should merely be understood such that blocks having the structure shown may in principle be present in the polyether carbonate polyol obtained, but the sequence, number and length of the blocks and OH functionality of the starter can vary, and is not limited to the polyether carbonate polyol shown in scheme (I). This reaction (see scheme (I)) is environmentally very advantageous since this reaction constitutes the conversion of a greenhouse gas such as $CO_2$ to a polymer. A further product, actually a by-product, formed is the cyclic carbonate shown in scheme (I) (for example, when $R=CH_3$, propylene carbonate).

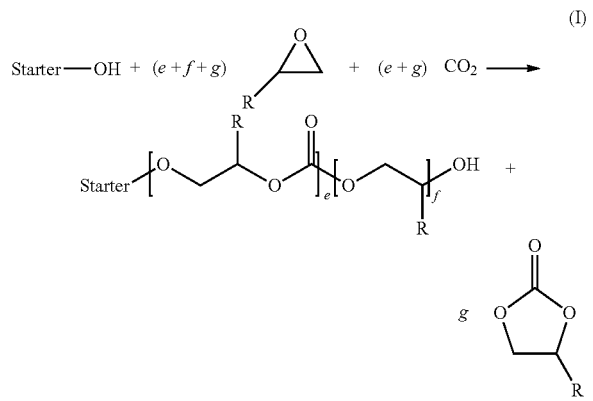

EP-A 0 222 453 discloses a process for preparing polycarbonates from alkylene oxides and carbon dioxide using a catalyst system composed of DMC catalyst and a cocatalyst such as zinc sulfate. This polymerization is initiated by a one-off contacting of a portion of the alkylene oxide with the catalyst system. Only thereafter are the remaining amount of alkylene oxide and the carbon dioxide metered in simultaneously. The amount of 60% by weight of alkylene oxide compound relative to the H-functional starter substance, as specified in EP-A 0 222 453 for the activation step in examples 1 to 7, is high and has the disadvantage that this constitutes a certain safety risk for industrial scale applications because of the high exothermicity of the homopolymerization of alkylene oxide compounds.

WO-A 2003/029325 discloses a process for preparing high molecular weight aliphatic polyether carbonate polyols (weight-average molecular weight greater than 30 000 g/mol), in which a catalyst from the group consisting of zinc carboxylate and multimetal cyanide compound is used, this catalyst being anhydrous and first being contacted with at least a portion of the carbon dioxide before the alkylene oxide is added. Final $CO_2$ pressures of up to 150 bar place very high demands on the reactor and on safety. Even the extremely high pressure of 150 bar resulted in incorporation of only about 33% by weight of $CO_2$ up to a maximum of 42% by weight of $CO_2$. The accompanying examples describe the use of a solvent (toluene) which has to be removed again by thermal means after the reaction, thus resulting in increased time and cost demands. Furthermore, the polymers, with a polydispersity of 2.7 or more, have a very broad molar mass distribution.

WO-A 2008/092767 discloses a process for preparing polyether carbonate polyols, characterized in that one or more H-functional starter substances are initially charged in the reactor and in that one or more H-functional starter substances are metered continuously into the reactor during the reaction. This process thus has the drawback that one or more H-functional starter substances have to be initially charged in the reactor.

European patent applications having application numbers EP12181907.2 and EP12181905.6 disclose processes for preparing polyether carbonate polyols by addition of alkylene oxides and carbon dioxide onto one or more H-functional starter substance(s) in the presence of a double metal cyanide catalyst, characterized in that suspension media containing no H-functional groups are initially charged in a reactor and one or more H-functional starter substance(s) are metered continuously into the reactor during the reaction. EP12181907.2 additionally discloses that it is possible here to add small amounts of phosphoric acid (e.g. 90 ppm of 85% $H_3PO_4$) to the starter substance metered in continuously (e.g. glycerol).

SUMMARY

It was therefore an object of the present invention to provide a process for preparing polyether carbonate polyols, wherein a favorable selectivity (i.e. low ratio of cyclic carbonate to linear polymer-bound carbonate) is achieved.

It has been found that, surprisingly, the object of the invention is achieved by a process for preparing polyether carbonate polyols by addition of alkylene oxides and carbon dioxide onto H-functional starter substance in the presence of a double metal cyanide (DMC) catalyst or in the presence of a metal complex catalyst based on the metals zinc and/or cobalt, wherein (α) optionally a portion of the H-functional starter substance and/or suspension medium containing no H-functional groups is initially charged in a reactor, in each case optionally together with DMC catalyst, (β) optionally a portion of alkylene oxide is added to the mixture from step (α) at temperatures of 90° C. to 150° C. and wherein the addition of the alkylene oxide compound is then interrupted, (γ) alkylene oxide and carbon dioxide are added onto H-functional starter substance in a reactor in the presence of a double metal cyanide catalyst or in the presence of a metal complex catalyst based on the metals zinc and/or cobalt to obtain a reaction mixture comprising the polyether carbonate polyol and wherein (δ) the reaction mixture obtained in step (γ) remains in the reactor or is continuously transferred into a postreactor, wherein in each case by way of a postreaction the content of free alkylene oxide in the reaction mixture is reduced, characterized in that during the postreaction a component K is added, wherein component K is selected from at least one compound containing a phosphorus-oxygen-hydrogen group.

DETAILED DESCRIPTION

Step (α):

The process according to the invention for preparing polyether carbonate polyols by addition of alkylene oxides and carbon dioxide onto H-functional starter substance may comprise step (α) in particular when the process is conducted in the presence of a double metal cyanide (DMC) catalyst.

The portion of the H-functional starter substance optionally used in step (α) may comprise component K, for example in an amount of at least 100 ppm, preferably of 100 bis 10000 ppm.

In the process according to the invention, it is possible first to initially charge the reactor with a portion of the H-functional starter substance and/or a suspension medium containing no H-functional groups. Subsequently, the amount of DMC catalyst required for the polyaddition, preferably in unactivated form, is added to the reactor. The sequence of addition is not crucial. It is also possible to charge the reactor first with the DMC catalyst and then with the suspension medium. Alternatively, it is also possible first to suspend the DMC catalyst in the inert suspension medium and then to charge the reactor with the suspension. The suspension medium provides an adequate heat exchange area with the reactor wall or cooling elements installed in the reactor, such that the heat of reaction released can be removed very efficiently. Moreover, the suspension medium, in the event of a cooling failure, provides heat capacity, such that the temperature in this case can be kept below the breakdown temperature of the reaction mixture.

Any suspension media used in accordance with the invention do not contain any H-functional groups. Suitable suspension media are all polar aprotic, weakly polar aprotic and nonpolar aprotic solvents, none of which contain any H-functional groups. The suspension medium used may also be a mixture of two or more of these suspension media. The following polar aprotic solvents are mentioned here by way of example: 4-methyl-2-oxo-1,3-dioxolane (also referred to hereinafter as cyclic propylene carbonate or cPC), 1,3-dioxolan-2-one (also referred to hereinafter as cyclic ethylene carbonate or cEC), acetone, methyl ethyl ketone, acetonitrile, nitromethane, dimethyl sulfoxide, sulfolane, dimethylformamide, dimethylacetamide and N-methylpyrrolidone. The group of the nonpolar and weakly polar aprotic solvents includes, for example, ethers, for example dioxane, diethyl ether, methyl tert-butyl ether and tetrahydrofuran, esters, for example ethyl acetate and butyl acetate, hydrocarbons, for example pentane, n-hexane, benzene and alkylated benzene derivatives (e.g. toluene, xylene, ethylbenzene) and chlorinated hydrocarbons, for example chloroform, chlorobenzene, dichlorobenzene and carbon tetrachloride. Preferred suspension media used are 4-methyl-2-oxo-1,3-dioxolane, 1,3-dioxolan-2-one, toluene, xylene, ethylbenzene, chlorobenzene and dichlorobenzene, and mixtures of two or more of these suspension media; particular preference is given to 4-methyl-2-oxo-1,3-dioxolane and 1,3-dioxolan-2-one or a mixture of 4-methyl-2-oxo-1,3-dioxolane and 1,3-dioxolan-2-one.

Likewise suitable as suspension media used in accordance with the invention are aliphatic lactones, aromatic lactones, lactides, cyclic carbonates having at least three optionally substituted methylene groups between the oxygen atoms of the carbonate group, aliphatic cyclic anhydrides and aromatic cyclic anhydrides.

Aliphatic or aromatic lactones in the context of the invention are cyclic compounds containing an ester bond in the ring, preferably 4-membered lactone rings such as β-propiolactone, β-butyrolactone, β-isovalerolactone, β-caprolactone, β-isocaprolactone, β-methyl-β-valerolactone, 5-membered lactone rings such as γ-butyrolactone, γ-valerolactone, 5-methylfuran-2(3H)-one, 5-methylidenedihydrofuran-2(3H)-one, 5-hydroxyfuran-2(5H)-one, 2-benzofuran-1 (3H)-one and 6-methyl-2-benzofuran-1(3H)-one, 6-membered lactone rings such as 1,4-dioxan-2-one, dihydrocumarin, 1H-isochromen-1-one, 8H-pyrano[3,4-b]pyridin-8-one, 1,4-dihydro-3H-isochromen-3-one, 7,8-dihydro-5H-pyrano[4,3-b]pyridin-5-one, 4-methyl-3,4-dihydro-1H-pyrano[3,4-b]pyridin-1-one, 6-hydroxy-3,4-dihydro-1H-isochromen-1-one, 7-hydroxy-3,4-dihydro-2H-chromen-2-one, 3-ethyl-1H-isochromen-1-one, 3-(hydroxymethyl)-1H-isochromen-1-one, 9-hydroxy-1H, 3H-benzo[de]isochromen-1-one, 6,7-dimethoxy-1,4-dihydro-3H-isochromen-3-one and 3-phenyl-3,4-dihydro-1H-isochromen-1-one, 7-membered lactone rings such as ε-caprolactone, 1,5-dioxepan-2-one, 5-methyloxepan-2-one, oxepane-2,7-dione, thiepan-2-one, 5-chlorooxepan-2-one, (4S)-4-(propan-2-yl)oxepan-2-one, 7-butyloxepan-2-one, 5-(4-aminobutyl)oxepan-2-one, 5-phenyloxepan-2-one, 7-hexyloxepan-2-one, (5S,7S)-5-methyl-7-(propan-2-yl)oxepan-2-one, 4-methyl-7-(propan-2-yl)oxepan-2-one, higher-membered lactone rings such as (7E)-oxacycloheptadec-7-en-2-one.

Particular preference is given to ε-caprolactone and dihydrocoumarin.

Lactides in the context of the invention are cyclic compounds containing two or more ester bonds in the ring, preferably glycolide (1,4-dioxane-2,5-dione), L-lactide (L-3,6-dimethyl-1,4-dioxane-2,5-dione), D-lactide, DL-lactide, mesolactide and 3-methyl-1,4-dioxane-2,5-dione, 3-hexyl-6-methyl-1,4-dioxane-2,5-dione, 3,6-di(but-3-en-1-yl)-1,4-dioxane-2,5-dione (in each case including optically active forms). Particular preference is given to L-lactide.

Cyclic carbonates having at least three optionally substituted methylene groups between the oxygen atoms of the carbonate group are preferably trimethylene carbonate, neopentyl glycol carbonate (5,5-dimethyl-1,3-dioxan-2-one), 2,2,4-trimethylpentane-1,3-diol carbonate, 2,2-dimethylbutane-1,3-diol carbonate, butane-1,3-diol carbonate, 2-methylpropane-1,3-diol carbonate, pentane-2,4-diol carbonate, 2-methylbutane-1,3-diol carbonate, TMP monoallyl ether carbonate, pentaerythritol diallyl ether carbonate, 5-(2-hydroxyethyl)-1,3-dioxan-2-one, 5-[2-(benzyloxy)ethyl]-1,3- dioxan-2-one, 4-ethyl-1,3-dioxolan-2-one, 1,3-dioxolan-2-one, 5-ethyl-5-methyl-1,3-dioxan-2-one, 5,5-diethyl-1,3-dioxan-2-one, 5-methyl-5-propyl-1,3-dioxan-2-one, 5-(phenylamino)-1,3-dioxan-2-one and 5,5-dipropyl-1,3-dioxan-2-one. Particular preference is given to trimethylene carbonate and neopentyl glycol carbonate.

Cyclic anhydrides are preferably succinic anhydride, maleic anhydride, phthalic anhydride, cyclohexane-1,2-dicarboxylic anhydride, diphenic anhydride, tetrahydrophthalic anhydride, methyltetrahydrophthalic anhydride, norbomenedioic anhydride and chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride, allylnorbornenedioic anhydride, 3-methylfuran-2,5-dione, 3-methyldihydrofuran-2,5-dione, dihydro-2H-pyran-2,6(3H)-dione, 1,4-dioxane-2,6-dione, 2H-pyran-2,4,6(3H,5H)-trione, 3-ethyldihydrofuran-2,5-dione, 3-methoxydihydrofuran-2,5-dione, 3-(prop-2-en-1-yl)dihydrofuran-2,5-dione, N-(2,5-dioxotetrahydrofuran-3-yl)formamide and 3[(2E)-but-2-en-1-yl]dihydrofuran-2,5-dione. Particular preference is given to succinic anhydride, maleic anhydride and phthalic anhydride.

The suspension medium used may also be a mixture of two or more of the suspension media mentioned. Most preferably, the suspension medium used in step (α) is at least one compound selected from the group consisting of 4-methyl-2-oxo-1,3-dioxolane, 1,3-dioxolan-2-one, acetone, methyl ethyl ketone, acetonitrile, nitromethane, dimethyl sulfoxide, sulfolane, dimethylformamide, dimethylacetamide, N-methylpyrrolidone, dioxane, diethyl ether, methyl tert-butyl ether, tetrahydrofuran, ethyl acetate, butyl acetate, pentane, n-hexane, benzene, toluene, xylene, ethylbenzene, chloroform, chlorobenzene, dichlorobenzene, carbon tetrachloride, ε-caprolactone, dihydrocoumarin, trimethylene carbonate, neopentyl glycol carbonate, 3,6-diethyl-1,4-dioxane-2,5-dione, succinic anhydride, maleic anhydride and phthalic anhydride.

In one embodiment of the invention, in step (α), a suspension medium containing no H-functional groups is initially charged in the reactor, optionally together with DMC catalyst, without initially charging any H-functional starter substance in the reactor. Alternatively, it is also possible in step (α) to initially charge the reactor with a suspension medium containing no H-functional groups, and additionally a portion of the H-functional starter substance(s) and optionally DMC catalyst.

The DMC catalyst is preferably used in an amount such that the content of DMC catalyst in the reaction product resulting after step (γ) is 10 to 10 000 ppm, more preferably 20 to 5000 ppm and most preferably 50 to 500 ppm.

In a preferred embodiment, in step (α), inert gas (for example argon or nitrogen), an inert gas/carbon dioxide mixture or carbon dioxide is introduced into the resulting mixture (i) of a portion of the H-functional starter substance and/or suspension medium and (ii) DMC catalyst at a temperature of 90° C. to 150° C., more preferably of 100° C. to 140° C., and at the same time a reduced pressure (absolute) of 10 mbar to 800 mbar, more preferably of 50 mbar to 200 mbar, is applied.

In an alternative preferred embodiment, in step (α), the resulting mixture (i) of a portion of the H-functional starter substance(s) and/or suspension medium and (ii) DMC catalyst is contacted at least once, preferably three times, at a temperature of 90° C. to 150° C., more preferably of 100° C. to 140° C., with 1.5 bar to 10 bar (absolute), more preferably 3 bar to 6 bar (absolute), of an inert gas (for example argon or nitrogen), an inert gas/carbon dioxide mixture or carbon dioxide and then the positive pressure is reduced in each case to about 1 bar (absolute).

The DMC catalyst can be added in solid form or as a suspension in a suspension medium or in a mixture of at least two suspension media.

In a further preferred embodiment, in step (α), (α-I) a portion of the H-functional starter substance and/or suspension medium is initially charged and (α-II) the temperature of the portion of the H-functional starter substance and/or the suspension medium is brought to 50 to 200° C., preferably 80 to 160° C., more preferably 100 to 140° C., and/or the pressure in the reactor is lowered to less than 500 mbar, preferably 5 mbar to 100 mbar, in the course of which an inert gas stream (for example of argon or nitrogen), an inert gas/carbon dioxide stream or a carbon dioxide stream is optionally passed through the reactor, wherein the double metal cyanide catalyst is added to the portion of the H-functional starter substance and/or suspension medium in step (α-I) or immediately thereafter in step (α-II), and wherein the suspension medium does not contain any H-functional groups.

Step (β):

Step (β) serves to activate the DMC catalyst and thus relates to the embodiment of the process according to the invention in the presence of a DMC catalyst. This step (β) can optionally be conducted under inert gas atmosphere, under an atmosphere composed of an inert gas/carbon dioxide mixture or under a carbon dioxide atmosphere. Activation in the context of this invention refers to a step in which a portion of alkylene oxide is added to the DMC catalyst suspension at temperatures of 90° C. to 150° C. and then the addition of the alkylene oxide is stopped, with observation of evolution of heat caused by a subsequent exothermic chemical reaction, which can lead to a temperature spike ("hotspot"), and of a pressure drop in the reactor caused by the conversion of alkylene oxide and possibly $CO_2$. The process step of activation is the period of time from the addition of the portion of alkylene oxide, optionally in the presence of $CO_2$, to the DMC catalyst until the occurrence of the evolution of heat. Optionally, the portion of the alkylene oxide can be added to the DMC catalyst in a plurality of individual steps, optionally in the presence of $CO_2$, and then the addition of the alkylene oxide can be stopped in each case. In this case, the process step of activation comprises the period from the addition of the first portion of alkylene oxide, optionally in the presence of $CO_2$, to the DMC catalyst until the occurrence of the evolution of heat after addition of the last portion of alkylene oxide. In general, the activation step may be preceded by a step for drying the DMC catalyst and optionally the H-functional starter substance at elevated temperature and/or reduced pressure, optionally with passage of an inert gas through the reaction mixture.

The metered addition of one or more alkylene oxides (and optionally of the carbon dioxide) can in principle be effected in different ways. The metered addition can be started from the reduced pressure or at a preselected supply pressure. The supply pressure is preferably established by introducing an inert gas (for example nitrogen or argon) carbon dioxide, the (absolute) pressure being 5 mbar to 100 bar, preferably 10 mbar to 50 bar and more preferably 20 mbar to 50 bar.

In a preferred embodiment, the amount of one or more alkylene oxides used in the activation in step (β) is 0.1% to 25.0% by weight, preferably 1.0% to 25.0% by weight, more preferably 2.0% to 16.0% by weight (based on the amount of suspension medium used in step (α)). The alkylene oxide can be added in one step or in two or more portions. Preferably, addition of a portion of the alkylene oxide is followed by interruption of the addition of the alkylene oxide until the occurrence of evolution of heat, and only then is the next portion of alkylene oxide. Preference is also given to a two-stage activation (step β), wherein (β1) in a first activation stage a first portion of alkylene oxide is added under inert gas atmosphere and (β2) in a second activation stage a second portion of alkylene oxide is added under carbon dioxide atmosphere.

Step (γ):

The metered addition of the H-functional starter substance, alkylene oxide and optionally also of the carbon dioxide can be effected simultaneously or sequentially (in portions); for example, it is possible to add the total amount of carbon dioxide, the amount of H-functional starter substances and/or the amount of alkylene oxides metered in step (γ) all at once or continuously. The term "continuous" as used here can be defined as a mode of addition of a reactant such that a concentration of the reactant effective for the copolymerization is maintained, meaning that, for example, the metered addition can be effected with a constant metering rate, with a varying metering rate or in portions.

It is possible, during the addition of the alkylene oxide and/or the H-functional starter substances, to increase or lower the $CO_2$ pressure gradually or stepwise or to leave it constant. Preferably, the total pressure is kept constant during the reaction by replenishment of carbon dioxide. The metered addition of alkylene oxide and/or of H-functional starter substance is effected simultaneously or sequentially with respect to the metered addition of carbon dioxide. It is possible to meter in the alkylene oxide with a constant metering rate or to increase or lower the metering rate gradually or stepwise or to add the alkylene oxide in portions. Preferably, the alkylene oxide is added to the reaction mixture at a constant metering rate. If two or more alkylene oxides are used for synthesis of the polyether carbonate polyols, the alkylene oxides can be metered in individually or as a mixture. The metered addition of the alkylene oxides or the H-functional starter substances can be effected simultaneously or sequentially (in portions) via separate feeds (additions) or via one or more feeds, in which case the alkylene oxide or the H-functional starter substances can be metered in individually or as a mixture. It is possible via the manner and/or sequence of the metered addition of the H-functional starter substances, the alkylene oxides and/or the carbon dioxide to synthesize random, alternating, block or gradient polyether carbonate polyols.

In a preferred embodiment, in step (γ), the metered addition of the H-functional starter substance is terminated at a juncture prior to the addition of the alkylene oxide.

Preference is given to using an excess of carbon dioxide based on the calculated amount of carbon dioxide incorporated in the polyether carbonate polyol, since an excess of carbon dioxide is advantageous because of the inertness of carbon dioxide. The amount of carbon dioxide can be fixed via the total pressure under the particular reaction conditions. An advantageous total (absolute) pressure for the copolymerization for preparation of the polyether carbonate polyols has been found to be the range from 0.01 to 120 bar, preferably 0.1 to 110 bar, more preferably from 1 to 100 bar. It is possible to feed in the carbon dioxide continuously or discontinuously. This depends on how quickly the alkylene oxides are consumed and whether the product is supposed to contain any $CO_2$-free polyether blocks. The amount of the carbon dioxide (reported as pressure) can likewise vary in the course of addition of the alkylene oxides. $CO_2$ may also be added to the reactor as a solid and then converted to the gaseous, dissolved, liquid and/or supercritical state under the chosen reaction conditions.

One feature of a preferred embodiment of the process according to the invention is that in step (γ) the total amount of the H-functional starter substance is added. This addition can be effected at a constant metering rate, with a varying metering rate, or in portions.

For the process according to the invention, it has additionally been found that the copolymerization (step (γ)) for preparation of the polyether carbonate polyols is conducted advantageously at 50° C. to 150° C., preferably at 60° C. to 145° C., more preferably at 70° C. to 140° C. and most preferably at 90° C. to 130° C. If temperatures below 50° C. are set, the reaction generally becomes very slow. At temperatures above 150° C., the amount of unwanted by-products rises significantly.

The metered addition of the alkylene oxide, the H-functional starter substance and the DMC catalyst can be effected via separate or combined metering points. In a preferred embodiment, the alkylene oxide and the H-functional starter substance are metered continuously into the reaction mixture via separate metering points. This addition of the H-functional starter substance can be effected in the form of a continuous metered addition to the reactor or in portions.

Steps (α), (β) and (γ) can be conducted in the same reactor or each separately in different reactors. Particularly preferred reactor types are: tubular reactors, stirred tanks, loop reactors.

Polyether carbonate polyols can be prepared in a stirred tank, in which case the stirred tank, according to the embodiment and mode of operation, is cooled via the reactor jacket, internal cooling surfaces and/or cooling surfaces within a pumped circulation system. Both in semi-batchwise application, in which the product is not removed until after the end of the reaction, and in continuous application, in which the product is removed continuously, particular attention should be paid to the metering rate of the alkylene oxide. It should be adjusted such that the alkylene oxides react sufficiently rapidly despite the inhibiting effect of the carbon dioxide. The concentration of free alkylene oxides in the reaction mixture during the activation step (step β) is preferably >0% to 100% by weight, more preferably >0% to 50% by weight, most preferably >0% to 20% by weight (based in each case on the weight of the reaction mixture). The concentration of free alkylene oxides in the reaction mixture during the reaction (step γ) is preferably >0% to 40% by weight, more preferably >0% to 25% by weight, most preferably >0% to 15% by weight (based in each case on the weight of the reaction mixture).

In a preferred embodiment, the mixture comprising the activated DMC catalyst that results from steps (α) and (β) is reacted further in the same reactor with one or more alkylene oxide(s), one or more starter substance(s) and carbon dioxide. In a further preferred embodiment, the mixture comprising activated DMC catalyst that results from steps (α) and (β) is reacted further with alkylene oxides, one or more starter substance(s) and carbon dioxide in another reaction vessel (for example a stirred tank, tubular reactor or loop reactor).

In the case of a reaction conducted in a tubular reactor, the mixture comprising activated DMC catalyst that results from steps (α) and (β), one or more H-functional starter substance(s), one or more alkylene oxide(s) and carbon dioxide are pumped continuously through a tube. The molar ratios of the co-reactants vary according to the desired polymer. In a preferred embodiment, carbon dioxide is metered in here in its liquid or supercritical form, in order to enable optimal miscibility of the components. It is advantageous to install mixing elements for better mixing of the co-reactants as are marketed for example by Ehrfeld Mikrotechnik BTS GmbH or mixer-heat exchanger elements which simultaneously improve mixing and heat removal.

Loop reactors can likewise be used for preparation of polyether carbonate polyols. These generally include reactors having recycling of matter, for example a jet loop reactor, which can also be operated continuously, or a tubular reactor designed in the form of a loop with suitable apparatuses for the circulation of the reaction mixture, or a loop of several series-connected tubular reactors. The use of a loop reactor is advantageous especially because backmixing can be achieved here, such that it is possible to keep the concentration of free alkylene oxides in the reaction mixture within the optimal range, preferably in the range from >0% to 40% by weight, more preferably >0% to 25% by weight, most preferably >0% to 15% by weight (based in each case on the weight of the reaction mixture).

Preferably, the polyether carbonate polyols are prepared in a continuous process which comprises both a continuous copolymerization and a continuous addition of the one or more H-functional starter substance(s).

The invention therefore also provides a process wherein, in step (γ), H-functional starter substance, alkylene oxide and DMC catalyst are metered continuously into the reactor in the presence of carbon dioxide ("copolymerization") and wherein the resulting reaction mixture (comprising the reaction product) is removed continuously from the reactor. Preferably, in step (γ), the DMC catalyst is added continuously in suspension in H-functional starter substance.

For example, for the continuous process for preparing the polyether carbonate polyols in steps (α) and (β), a mixture containing activated DMC catalyst is prepared, then, in step (γ), (γ1) a portion each of H-functional starter substance, one or more alkylene oxide(s) and carbon dioxide are metered in to initiate the copolymerization, and (γ2) during the progress of the copolymerization, the remaining amount of each of DMC catalyst, H-functional starter substance and alkylene oxide is metered in continuously in the presence of carbon dioxide, with simultaneous continuous removal of resulting reaction mixture from the reactor.

In step (γ), the DMC catalyst is preferably added in a suspension in the H-functional starter substance, the amount preferably being chosen such that the content of DMC catalyst in the reaction product resulting in step (γ) is 10 to 10 000 ppm, more preferably 20 to 5000 ppm and most preferably 50 to 500 ppm.

Preferably, steps (α) and (β) are conducted in a first reactor, and the resulting reaction mixture is then transferred into a second reactor for the copolymerization in step (γ). It is also possible to conduct steps (α), (β) and (γ) in one reactor.

It has also been found that the process of the present invention can be used for preparation of large amounts of the polyether carbonate polyol, in which case a DMC catalyst activated according to steps (α) and (β) in a portion of the H-functional starter substance and/or in suspension medium is initially used, and the DMC catalyst is added without prior activation during the copolymerization (γ).

A particularly advantageous feature of the preferred embodiment of the present invention is thus the ability to use "fresh" DMC catalysts without activation of the portion of DMC catalyst which is added continuously in step (γ). An activation of DMC catalysts to be conducted analogously to step (β) encompasses not just additional attention from the operator, which results in an increase in manufacturing costs, but also requires a pressure reaction vessel, which also results in an increase in the capital costs in the construction of a corresponding production plant. Here, "fresh" DMC catalyst is defined as unactivated DMC catalyst in solid form or in the form of a slurry in H-functional starter substance or in suspension medium. The ability of the present process to use fresh unactivated DMC catalyst in step (γ) enables significant savings in the commercial preparation of polyether carbonate polyols and is a preferred embodiment of the present invention.

The term "continuously" used here can be defined as the mode of addition of a relevant catalyst or reactant such that an essentially continuous effective concentration of the DMC catalyst or the reactant is maintained. The catalysts can be fed in a truly continuous manner or in relatively tightly spaced increments. Equally, continuous addition of starter can be effected in a truly continuous manner or in increments. There would be no departure from the present process in adding a DMC catalyst or reactants incrementally such that the concentration of the materials added drops essentially to zero for a period prior to the next incremental addition. However, it is preferable that the DMC catalyst concentration is kept essentially at the same concentration during the main portion of the procedure of the continuous reaction, and that starter substance is present during the main portion of the copolymerization process. Incremental addition of DMC catalyst and/or reactant that does not significantly affect the characteristics of the product is nevertheless "continuous" in that sense in which the term is used here. It is possible, for example, to provide a recycling loop in which a portion of the reacting mixture is recycled to a prior point in the process, which smooths out discontinuities caused by incremental additions.

Step (δ)

In step (δ) the reaction mixture obtained in step (γ) which generally comprises a content of 0.05% by weight to 10% by weight of alkylene oxide is subjected in the reactor to a postreaction or continuously transferred into a postreactor for postreaction, wherein by way of the postreaction the content of free alkylene oxide is reduced. In step (δ) by way of the postreaction the content of free alkylene oxide is preferably reduced to less than 0.5 g/l, more preferably to less than 0.1 g/l, in the reaction mixture.

When the reaction mixture obtained in step (γ) remains in the reactor the reaction mixture is preferably held for 10 min to 24 h at a temperature of 60° C. to 140° C., more preferably 1 h to 12 h at a temperature of 80° C. to 130° C. for the purposes of postreaction. The reaction mixture is preferably stirred during this until the content of free alkylene oxide has fallen to less than 0.5 g/l, more preferably to less than 0.1 g/l, in the reaction mixture. The consumption of free alkylene oxide and optionally carbon dioxide generally causes the pressure in the reactor to fall during the postreaction in step (δ) until a constant value has been achieved.

The postreactor used may, for example, be a tubular reactor, a loop reactor or a stirred tank. Preferably, the pressure in this postreactor is at the same pressure as in the reaction apparatuses in which reaction step (γ) is conducted. However, the pressure chosen in the downstream reactor may also be higher or lower. In a further preferred embodiment, the carbon dioxide is fully or partly discharged after reaction step (γ) and the downstream reactor is operated at standard pressure or a low positive pressure. The temperature in the downstream reactor is preferably 50 to 150° C. and more preferably 80 to 140° C.

The postreactor employed is preferably a tubular reactor, wherein for example a single tubular reactor or else a cascade of a plurality of tubular reactors arranged in parallel or linearly arranged in series may be used. The residence time is preferably between 5 min and 10 h, more preferably between 10 min and 5 h.

During the postreaction (step (δ)) component K is added, wherein component K is selected from at least one compound containing a phosphorus-oxygen-hydrogen group.

Component K is added during the postreaction preferably at a content of free alkylene oxide of 0.1 g/l to 10 g/l, more preferably of 1 g/l to 10 g/l of alkylene oxide and most preferably of 5 g/l to 10 g/l.

When conducting the process according to the invention using a tubular reactor for the postreaction in step (δ) metered addition of component K is preferably effected in the second half of the route that the reaction mixture traverses in the tubular reactor.

Component K

Compounds suitable as component K are characterized in that they contain at least one phosphorus-oxygen-hydrogen group. Preferably, component K is selected from at least one compound from the group consisting of phosphoric acid,
mono- and dialkyl esters of phosphoric acid,
mono- and diaryl esters of phosphoric acid,
mono- and dialkaryl esters of phosphoric acid,
$(NH_4)_2HPO_4$,
phosphonic acid,
monoalkyl esters of phosphonic acid,
monoaryl esters of phosphonic acid,
monoalkaryl esters of phosphonic acid,
phosphorous acid,
mono- and dialkyl esters of phosphorous acid,
mono- and diaryl esters of phosphorous acid,
mono- and dialkaryl esters of phosphorous acid and
phosphinic acid.

The mono- or dialkyl esters of phosphoric acid are preferably the mono- or dialkyl esters of orthophosphoric acid, mono-, di- or trialkyl esters of pyrophosphoric acid and mono-, di-, tri-, tetra- or polyalkyl esters of polyphosphoric acid, more preferably the respective esters with alcohols having 1 to 30 carbon atoms. The mono- or diaryl esters of phosphoric acid are preferably the mono- or diaryl esters of orthophosphoric acid, mono-, di- or triaryl esters of pyrophosphoric acid and mono-, di-, tri-, tetra- or polyaryl esters of polyphosphoric acid, more preferably the respective esters with alcohols having 6 to 10 carbon atoms. The mono- or dialkaryl esters of phosphoric acid are preferably the mono- or dialkaryl esters of orthophosphoric acid, mono-, di- or trialkaryl esters of pyrophosphoric acid and mono-, di-, tri-, tetra- or polyalkaryl esters of polyphosphoric acid, more preferably the respective esters with alcohols having 7 to 30 carbon atoms. Examples of compounds suitable as component K include: diethyl phosphate, monoethyl phosphate, dipropyl phosphate, monopropyl phosphate, dibutyl phosphate, monobutyl phosphate, diphenyl phosphate, dicresyl phosphate, fructose 1,6-biphosphate, glucose 1-phosphate, bis(4-nitrophenyl) phosphate, dibenzyl phosphate, diethyl 3-butenyl phosphate, dihexadecyl phosphate, diphenyl phosphate, diphenyl chlorophosphate, 2-hydroxyethyl methacrylate phosphate.

Preferably employed monoalkyl esters of phosphonic acid are the respective esters with alcohols having 1 to 30 carbon atoms. Preferably employed monoaryl esters of phosphonic acid are the respective esters with alcohols having 6 to 10 carbon atoms. Preferably employed monoalkaryl esters of phosphonic acid are the respective esters with alcohols having 7 to 30 carbon atoms.

Preferably employed mono- and dialkyl esters of phosphorous acid are esters with alcohols having 1 to 30 carbon atoms. This includes for example phenylphosphonic acid, butylphosphonic acid, dodecylphosphonic acid, ethylhexylphosphonic acid, octylphosphonic acid, ethylphosphonic acid, methylphosphonic acid and octadecylphosphonic acid. Preferably employed mono- and diaryl esters of phosphorous acid are the respective esters with alcohols having 6 to 10 carbon atoms. Preferably employed mono- and dialkaryl esters of phosphorous acid are the respective esters with alcohols having 7 to 30 carbon atoms.

Component K is particularly preferably selected from at least one compound from the group consisting of phosphoric acid, phosphonic acid and phosphinic acid. Component K is most preferably phosphoric acid.

The alcohols having 1 to 30 carbon atoms recited in the description of component K are for example methanol, ethanol, propanol, butanol, pentanol, hexanol, heptanol, octanol, nonanol, decanol, dodecanol, tridecanol, tetradecanol, pentadecanol, hexadecanol, heptadecanol, octadecanol, nonadecanol, methoxymethanol, ethoxymethanol, propoxymethanol, butoxymethanol, 2-ethoxyethanol, 2-propoxyethanol, 2-butoxyethanol, phenol, ethyl hydroxyacetate, propyl hydroxyacetate, ethyl hydroxypropionate, propyl hydroxypropionate, 1,2-ethanediol, 1,2-propanediol, 1,2,3-trihydroxypropane, 1,1,1-trimethylolpropane or pentaerythritol.

Also suitable as component K are compounds of phosphorus that can form one or more phosphorus-oxygen-hydrogen groups by reaction with OH-functional compounds (such as water for example). Examples of such compounds of phosphorus that are useful include phosphorus(V) sulfide, phosphorus tribromide, phosphorus trichloride and phosphorus triiodide.

It is also possible to employ any desired mixtures of the abovementioned compounds as component K. Component K may also be employed in admixture with suspension medium or in admixture with trialkyl phosphate (in particular triethyl phosphate).

During the postreaction component K is preferably employed in an amount of 5 ppm to 1000 ppm, more preferably of 10 ppm to 500 ppm, most preferably of 20 to 200 ppm, in each case based on the reaction mixture obtained in step (γ).

Alkylene Oxides

The process according to the invention may generally employ alkylene oxides (epoxides) having 2-24 carbon atoms. The alkylene oxides having 2-24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or poly-epoxidized fats as mono-, di- and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkoxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. Alkylene oxides used are preferably ethylene oxide and/or propylene oxide, especially propylene oxide.

H-Functional Starter Substance

Suitable H-functional starter substances ("starters") that may be used are compounds having alkoxylation-active hydrogen atoms and having a molar mass of 18 to 4500 g/mol, preferably of 62 to 500 g/mol and more preferably of 62 to 182 g/mol. The ability to use a starter having a low molar mass is a distinct advantage over the use of oligomeric starters prepared by means of a prior oxyalkylation. More particularly, economic viability is achieved, which is enabled by the omission of a separate oxyalkylation process.

Groups which have active hydrogen atoms and are active in respect of the alkoxylation are, for example, —OH, —NH$_2$ (primary amines), —NH— (secondary amines), —SH and —CO$_2$H, preferably —OH and —NH$_2$, especially preferably —OH. H-functional starter substances used are, for example, one or more compounds selected from the group consisting of mono- and polyhydric alcohols, polyfunctional amines, polyfunctional thiols, amino alcohols, thio alcohols, hydroxy esters, polyether polyols, polyester polyols, polyester ether polyols, polyether carbonate polyols, polycarbonate polyols, polycarbonates, polyethyleneimines, polyetheramines, polytetrahydrofurans (e.g. PolyTHF® from BASF), polytetrahydrofuranamines, polyether thiols, polyacrylate polyols, castor oil, the mono- or diglyceride of ricinoleic acid, monoglycerides of fatty acids, chemically modified mono-, di- and/or triglycerides of fatty acids, and $C_1$-$C_{24}$ alkyl fatty acid esters containing an average of at least 2 OH groups per molecule. The $C_1$-$C_{24}$ alkyl fatty acid esters containing an average of at least 2 OH groups per molecule are, for example, commercially available products such as Lupranol Balance® (BASF AG), the Merginol® range (Hobum Oleochemicals GmbH), the Sovermol® range (Cognis Deutschland GmbH & Co. KG) and the Soyol® TM range (USSC Co.).

Monofunctional starter substances used may be alcohols, amines, thiols and carboxylic acids. Monofunctional alcohols used may be: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Useful monofunctional amines include: butylamine, t-butylamine, pentylamine, hexylamine, aniline, aziridine, pyrrolidine, piperidine, morpholine. Monofunctional thiols used may be: ethanethiol, propane-1-thiol, propane-2-thiol, butane-1-thiol, 3-methylbutane-1-thiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Polyhydric alcohols suitable as H-functional starter substances are, for example, dihydric alcohols (for example ethylene glycol, diethylene glycol, propylene glycol, dipropylene glycol, propane-1,3-diol, butane-1,4-diol, butene-1,4-diol, butyne-1,4-diol, neopentyl glycol, pentane-1,5-diol, methylpentanediols (for example 3-methylpentane-1,5-diol), hexane-1,6-diol; octane-1,8-diol, decane-1,10-diol, dodecane-1,12-diol, bis(hydroxymethyl)cyclohexanes (for example 1,4-bis(hydroxymethyl)cyclohexane), triethylene glycol, tetraethylene glycol, polyethylene glycols, dipropylene glycol, tripropylene glycol, polypropylene glycols, dibutylene glycol and polybutylene glycols); trihydric alcohols (for example trimethylolpropane, glycerol, trishydroxyethyl isocyanurate, castor oil); tetrahydric alcohols (for example pentaerythritol); polyalcohols (for example sorbitol, hexitol, sucrose, starch, starch hydrolyzates, cellulose, cellulose hydrolyzates, hydroxy-functionalized fats and oils, in particular castor oil), and all modification products of these aforementioned alcohols with different amounts of ε-caprolactone.

The H-functional starter substances may also be selected from the substance class of the polyether polyols having a molecular weight $M_n$ in the range from 18 to 4500 g/mol and a functionality of 2 to 3. Preference is given to polyether polyols formed from repeat ethylene oxide and propylene oxide units, preferably having a proportion of 35% to 100% propylene oxide units, more preferably having a proportion of 50% to 100% propylene oxide units. These may be random copolymers, gradient copolymers, alternating or block copolymers formed from ethylene oxide and propylene oxide.

The H-functional starter substances may also be selected from the substance class of the polyester polyols. Polyester polyols used are at least difunctional polyesters. Polyester polyols preferably consist of alternating acid and alcohol units. Acid components used are, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the acids and/or anhydrides mentioned. Alcohol components used are, for example, ethanediol, propane-1,2-diol, propane-1,3-diol, butane-1,4-diol, pentane-1,5-diol, neopentyl glycol, hexane-1,6-diol, 1,4-bis(hydroxymethyl)cyclohexane, diethylene glycol, dipropylene glycol, trimethylolpropane, glycerol, pentaerythritol or mixtures of the alcohols mentioned. If the alcohol components used are dihydric or polyhydric polyether polyols, the result is polyester ether polyols which can likewise serve as starter substances for preparation of the polyether carbonate polyols.

In addition, H-functional starter substances used may be polycarbonatediols which are prepared, for example, by reaction of phosgene, dimethyl carbonate, diethyl carbonate or diphenyl carbonate and difunctional alcohols or polyester polyols or polyether polyols. Examples of polycarbonates can be found, for example, in EP-A 1359177.

In a further embodiment of the invention, it is possible to use polyether carbonate polyols as H-functional starter substances. In particular, polyether carbonate polyols obtainable by the process according to the invention described here are used. For this purpose, these polyether carbonate polyols used as H-functional starter substances are prepared in a separate reaction step beforehand.

The H-functional starter substances generally have a functionality (i.e. number of hydrogen atoms that are active for the polymerization per molecule) of 1 to 8, preferably of 2 or 3. The H-functional starter substances are used either individually or as a mixture of at least two H-functional starter substances.

It is particularly preferable when the H-functional starter substances are one or more compounds selected from the group consisting of ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, octane-1,8-diol, diethylene glycol, dipropylene glycol, glycerol, trimethylolpropane, pentaerythritol, sorbitol, polyether carbonate polyols having a molecular weight Mn in the range from 150 to 8000 g/mol with a functionality of 2 to 3 and polyether polyols having a molecular weight Mn in the range from 150 to 8000 g/mol and a functionality of 2 to 3.

The polyether carbonate polyols are prepared by catalytic addition of carbon dioxide and alkylene oxides onto H-functional starter substances. In the context of the invention, "H-functional" is understood to mean the number of alkoxylation-active hydrogen atoms per molecule of the starter substance.

DMC Catalysts

DMC catalysts for use in the homopolymerization of alkylene oxides are known in principle from the prior art (see, for example, U.S. Pat. No. 3,404,109, U.S. Pat. No. 3,829,505, U.S. Pat. No. 3,941,849 and U.S. Pat. No. 5,158,922). DMC catalysts, which are described, for example, in U.S. Pat. No. 5,470,813, EP-A 700 949, EP-A 743 093, EP-A 761 708, WO 97/40086, WO 98/16310 and WO 00/47649, have a very high activity and enable the preparation of polyether carbonate polyols at very low catalyst concentrations, such that a removal of the catalyst from the finished product is generally not required. A typical example is that of the highly active DMC catalysts which are described in EP-A 700 949 and contain not only a double metal cyanide compound (e.g. zinc hexacyanocobaltate(III)) and an organic complex ligand (e.g. tert-butanol) but also a polyether having a number-average molecular weight greater than 500 g/mol.

The DMC catalysts are preferably obtained by (i) reacting an aqueous solution of a metal salt with the aqueous solution of a metal cyanide salt in the presence of one or more organic complex ligands, e.g. an ether or alcohol, in a first step, (ii) in the second step separating the solids from the suspension obtained in (i) by known techniques (such as centrifugation or filtration), (iii) in a third step optionally washing the isolated solids with an aqueous solution of an organic complex ligand (for example by resuspension and subsequently reisolation by filtration or centrifugation), (iv) then drying the solids obtained at temperatures of generally 20-120° C. and at pressures of generally 0.1 mbar to atmospheric pressure (1013 mbar), optionally after pulverizing, and by, in the first step or immediately after the precipitation of the double metal cyanide compound (second step), adding one or more organic complex ligands, preferably in excess (based on the double metal cyanide compound) and optionally further complex-forming components.

The double metal cyanide compounds present in the DMC catalysts are the reaction products of water-soluble metal salts and water-soluble metal cyanide salts.

For example, an aqueous solution of zinc chloride (preferably in excess based on the metal cyanide salt, for example potassium hexacyanocobaltate) and potassium hexacyanocobaltate are mixed and then dimethoxyethane (glyme) or tert-butanol (preferably in excess, based on zinc hexacyanocobaltate) is added to the suspension formed.

Metal salts suitable for preparation of the double metal cyanide compounds preferably have the general formula (II)

$$M(X)_n \qquad (II)$$

wherein

M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$, X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

n is 1 when X=sulfate, carbonate or oxalate and n is 2 when X=halide, hydroxide, carboxylate, cyanate, thiocyanate, isocyanate, isothiocyanate or nitrate, or suitable metal salts have the general formula (III)

$$M_r(X)_3 \qquad (III)$$

wherein

M is selected from the metal cations $Fe^{3+}$, $Al^{3+}$, $Co^{3+}$ and $Cr^{3+}$, X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

r is 2 when X=sulfate, carbonate or oxalate and r is 1 when X=halide, hydroxide, carboxylate, cyanate, thiocyanate, isocyanate, isothiocyanate or nitrate, or suitable metal salts have the general formula (IV)

$$M(X)_s \qquad (IV)$$

wherein

M is selected from the metal cations $Mo^{4+}$, $V^{4+}$ and $W^{4+}$,

X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

s is 2 when X=sulfate, carbonate or oxalate and s is 4 when X=halide, hydroxide, carboxylate, cyanate, thiocyanate, isocyanate, isothiocyanate or nitrate, or suitable metal salts have the general formula (V)

$$M(X)_t \qquad (V)$$

wherein

M is selected from the metal cations $Mo^{6+}$ and $W^{6+}$,

X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

t is 3 when X=sulfate, carbonate or oxalate and t is 6 when X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparation of the double metal cyanide compounds preferably have the general formula (VI)

wherein
M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II),
Y is selected from one or more metal cations from the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$),
A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate or nitrate and
a, b and c are integers, where the values of a, b and c are selected so as to give an electrically neutral metal cyanide salt; a is preferably 1, 2, 3 or 4; b is preferably 4, 5 or 6; c preferably has the value of 0.

Examples of suitable metal cyanide salts are sodium hexacyanocobaltate(III), potassium hexacyanocobaltate (III), potassium hexacyanoferrate(II), potassium hexacyanoferrate(III), calcium hexacyanocobaltate(III) and lithium hexacyanocobaltate(III).

Preferred double metal cyanide compounds present in the DMC catalysts are compounds of general formula (VII)

where M is as defined in formula (II) to (V) and
M' is as defined in formula (VI), and
x, x', y and z are integers and are chosen so as to ensure electronic neutrality of the double metal cyanide compound.
Preferably,
x=3, x'=1, y=6 and z=2,
M=Zn(II), Fe(II), Co(II) or Ni(II) and
M'=Co(III), Fe(III), Cr(III) or Ir(III).

Examples of suitable double metal cyanide compounds are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). Particular preference is given to using zinc hexacyanocobaltate(III).

The organic complex ligands added in the preparation of the DMC catalysts are disclosed, for example, in U.S. Pat. No. 5,158,922 (see especially column 6 lines 9 to 65), U.S. Pat. No. 3,404,109, U.S. Pat. No. 3,829,505, U.S. Pat. No. 3,941,849, EP-A 700 949, EP-A 761 708, JP 4 145 123, U.S. Pat. No. 5,470,813, EP-A 743 093 and WO-A 97/40086). The organic complex ligands used are, for example, water-soluble organic compounds containing heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butyl, isobutanol, sec-butanol, tert-butanol, 2-methyl-3-buten-2-ol and 2-methyl-3-butyn-2-ol), compounds containing both aliphatic or cycloaliphatic ether groups and aliphatic hydroxyl groups (for example ethylene glycol mono-tert-butyl ether, diethylene glycol mono-tert-butyl ether, dipropylene glycol monomethyl ether and 3-methyl-3-oxetanemethanol). The organic complex ligands given greatest preference are selected from one or more compounds of the group consisting of dimethoxyethane, tert-butanol 2-methyl-3-buten-2-ol, 2-methyl-3-butyn-2-ol, ethylene glycol mono-tert-butyl ether and 3-methyl-3-oxetanemethanol.

Optionally used in the preparation of the DMC catalysts are one or more complex-forming component(s) from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ethers, polyvinyl ethyl ethers, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethyl cellulose and polyacetals, or of the glycidyl ethers, glycosides, carboxylic esters of polyhydric alcohols, gallic acids or salts, esters or amides thereof, cyclodextrins, phosphorus compounds, α,β-unsaturated carboxylic esters or ionic surface- or interface-active compounds.

Preferably, in the preparation of the DMC catalysts, in the first step, the aqueous solutions of the metal salt (e.g. zinc chloride), used in a stoichiometric excess (at least 50 mol %) based on metal cyanide salt (i.e. at least a molar ratio of metal salt the metal cyanide salt of 2.25:1.00), and of the metal cyanide salt (e.g. potassium hexacyanocobaltate) are converted in the presence of the organic complex ligand (e.g. tert-butanol), forming a suspension containing the double metal cyanide compound (e.g. zinc hexacyanocobaltate), water, excess metal salt and the organic complex ligand.

The organic complex ligand may be present in the aqueous solution of the metal salt and/or the metal cyanide salt, or it is added directly to the suspension obtained after precipitation of the double metal cyanide compound. It has been found to be advantageous to mix the aqueous solutions of the metal salt and the metal cyanide salt and the organic complex ligand with vigorous stirring. Optionally, the suspension formed in the first step is subsequently treated with a further complex-forming component. The complex-forming component is preferably used in a mixture with water and organic complex ligand. A preferred process for performing the first step (i.e. the preparation of the suspension) is effected using a mixing nozzle, more preferably using a jet disperser as described in WO-A 01/39883.

In the second step, the solid (i.e. the precursor of the catalyst) is isolated from the suspension by known techniques, such as centrifugation or filtration.

In a preferred variant, the isolated solids, in a third process step, are then washed with an aqueous solution of the organic complex ligand (for example by resuspension and subsequent reisolation by filtration or centrifugation). In this way, it is possible, for example, to remove water-soluble by-products, such as potassium chloride, from the catalyst. Preferably, the amount of the organic complex ligand in the aqueous wash solution is between 40% and 80% by weight, based on the overall solution.

Optionally, in the third step, further complex-forming component is added to the aqueous wash solution, preferably in the range between 0.5% and 5% by weight, based on the overall solution.

It is also advantageous to wash the isolated solids more than once. Preferably, in a first wash step (iii-1), washing is effected with an aqueous solution of the organic complex ligand (for example by resuspension and subsequently reisolation by filtration or centrifugation), in order in this way to remove, for example, water-soluble by-products, such as potassium chloride, from the catalyst. More preferably, the amount of the organic complex ligand in the aqueous wash solution is between 40% and 80% by weight, based on the overall solution for the first wash step. In the further wash steps (iii-2), either the first wash step is repeated once or more than once, preferably once to three times, or, preferably, a nonaqueous solution, for example a mixture or solution of organic complex ligand and further complex-forming component (preferably in the range between 0.5 and 5% by weight, based on the total amount of the wash solution in step (iii-2)), is used as a wash solution to wash the solid once or more than once, preferably once to three times.

The isolated and optionally washed solid is subsequently dried at temperatures of generally 20-100° C. and at pressures of generally 0.1 mbar to atmospheric pressure (1013 mbar), optionally after pulverizing.

A preferred process for isolation of the DMC catalysts from the suspension by filtration, filtercake washing and drying is described in WO-A 01/80994.

As well as the DMC catalysts based on zinc hexacyanocobaltate ($Zn_3[Co(CN)_6]_2$) that are used with preference, it is also possible to use other metal complex catalysts based on the metals zinc and/or cobalt that are known from the prior art for the copolymerization or epoxides and carbon dioxide for the process according to the invention. This especially includes what are called zinc glutarate catalysts (described, for example, in M. H. Chisholm et al., Macromolecules 2002, 35, 6494), what are called zinc diiminate catalysts (described, for example, in S. D. Allen, J. Am. Chem. Soc. 2002, 124, 14284), what are called cobalt salen catalysts (described, for example, in U.S. Pat. No. 7,304,172 B2, US 2012/0165549 A1)) and bimetallic zinc complexes with macrocyclic ligands (described, for example, in M. R. Kember et al., Angew. Chem., Int. Ed., 2009, 48, 931).

The polyether carbonate polyols obtained in accordance with the invention have a functionality of, for example, at least 1, preferably of 1 to 8, more preferably of 1 to 6 and most preferably of 2 to 4. The molecular weight is preferably 400 to 10 000 g/mol and more preferably 500 to 6000 g/mol.

The polyether carbonate polyols obtainable by the process according to the invention have a low content of by-products and can be processed without difficulty, especially by reaction with di- and/or polyisocyanates to afford polyurethanes, in particular flexible polyurethane foams. For polyurethane applications, it is preferable to use polyether carbonate polyols based on an H-functional starter substance having a functionality of at least 2. In addition, the polyether carbonate polyols obtainable by the process according to the invention can be used in applications such as washing and cleaning composition formulations, drilling fluids, fuel additives, ionic and nonionic surfactants, lubricants, process chemicals for papermaking or textile manufacture, or cosmetic formulations. The person skilled in the art is aware that, depending on the respective field of use, the polyether carbonate polyols to be used have to fulfill certain physical properties, for example molecular weight, viscosity, functionality and/or hydroxyl number.

EXAMPLES

Feedstocks:
  H-Functional Starter Substances
  α,ω-dihydroxypolypropylene oxide; OH number=260 mg KOH/g; Arcol Polyol 1004 from Bayer MaterialScience AG
  Alkylene Oxide
  Propylene oxide (PO)
  DMC catalyst The DMC catalyst used in all examples was DMC catalyst prepared according to example 6 in WO 01/80994 A1.

Methods:

The polymerization reactions were conducted in a 300 ml Parr pressure reactor. The reactor used in the examples was a pressure reactor and this had an (internal) height of 10.16 cm and an internal diameter of 6.35 cm. The reactor was equipped with an electrical heating jacket (510 watt maximum heating power). The counter-cooling consisted of an immersed tube of external diameter 6 mm which had been bent into a U shape and which projected into the reactor up to 5 mm above the base, and through which cooling water flowed at about 10° C. The water flow was switched on and off by means of a magnetic valve. In addition, the reactor was equipped with an inlet tube and a thermal sensor of diameter 1.6 mm, which both projected into the reactor up to 3 mm above the base.

The sparging stirrer used in the examples was a hollow shaft stirrer in which the gas was introduced into the reaction mixture present in the pressure reactor via a hollow shaft in the stirrer. The stirrer body attached to the hollow shaft comprised four arms, had a diameter of 35 mm and a height of 14 mm. Each end of the arm had two gas outlets of 3 mm in diameter attached to it. The rotation of the stirrer gave rise to a reduced pressure such that the gas present above the reaction mixture ($CO_2$ and possibly alkylene oxide) was drawn off and introduced through the hollow shaft of the stirrer into the reaction mixture. The description "rpm" used in the examples in connection with the sparging stirrer relates to the number of revolutions of the stirrer per minute.

The reaction was monitored using insitu IR spectroscopy. A Bruker Matrix-FM 120200MX instrument having a 3 mm diamond-tipped probe was used to this end. Using calibration data from the diamond-tipped probe the relevant concentration profiles of the reaction components were calculated from the measured spectra using S-PACT PEAXACT software.

The proportion of incorporated $CO_2$ in the resulting polyether carbonate polyol ("$CO_2$ incorporated") and the ratio of propylene carbonate to polyether carbonate polyol were determined by $^1$H-NMR (Bruker DPX 400, 400 MHz; pulse programme zg30, d1 relaxation delay: 10s, 64 scans). Each sample was dissolved in deuterated chloroform.

The relevant resonances in the $^1$H NMR spectrum (based on TMS=0 ppm) which were used for integration are as follows:

I1: 1.10-1.17 ppm: methyl group of the polyether units, resonance area corresponds to three hydrogen atoms,
I2: 1.25-1.34 ppm: methyl group of the polycarbonate units, resonance area corresponds to three hydrogen atoms,
I3: 1.45-1.48 ppm: methyl group of the cyclic carbonate, resonance area corresponds to three hydrogen atoms
I4: 2.95-3.00 ppm: CH group for free, unreacted propylene oxide, resonance area corresponds to one hydrogen atom.

The figures reported are the molar ratio of the amount of cyclic propylene carbonate to linear carbonate units in the polyether carbonate polyol (selectivity, g/e) and the molar ratio of carbonate groups to ether groups in the polyether carbonate polyol (e/f).

Taking account of the relative intensities, the values were calculated as follows: Molar ratio of the amount of cyclic propylene carbonate to linear carbonate units in the polyether carbonate polyol (selectivity, g/e):

$$g/e = I3/I2 \quad \text{(VIII)}$$

Molar ratio of carbonate groups to ether groups in the polyether carbonate polyol (e/f):

$$e/f = I2/I1 \quad \text{(IX)}$$

Taking account of the relative intensities, according to the following formula (X), a conversion was made to mol % for the polymer-bound linear carbonate ("linear carbonate" LC) in the reaction mixture:

$$LC = \frac{0.33 * I2}{0.33 * I2 + I4 + 0.33 * I1} * 100 \quad \text{(X)}$$

The weight fraction (in % by weight) of polymer-bound carbonate (LC') in the reaction mixture was calculated according to formula (XI), $$LC' = \frac{0.33 * I2 * 102}{N} * 100\% \quad \text{(XI)}$$

where the value of D ("denominator" D) is calculated according to formula (XII):

$$N = I2*102 + I3*102 + I4*58 + 0.33*I1*58 \quad \text{(XII)}$$

The factor of 102 results from the sum of the molar masses of $CO_2$ (molar mass 44 g/mol) and of propylene oxide (molar mass 58 g/mol); the factor of 58 results from the molar mass of propylene oxide.

The weight fraction (in % by weight) of cyclic carbonate (CC') in the reaction mixture was calculated according to formula (XIII):

$$CC' = \frac{I3 * 102}{N} * 100\% \quad \text{(XIII)}$$

where the value of N is calculated according to formula (XII).

In order to calculate the composition based on the polymer proportion (consisting of polyether which has been formed from propylene oxide during the activation steps which take place under $CO_2$-free conditions, and polyether carbonate polyol formed from starter, propylene oxide and carbon dioxide during the activation steps which take place in the presence of $CO_2$ and during the copolymerization) from the values for the composition of the reaction mixture, the non-polymeric constituents of the reaction mixture (i.e. cyclic propylene carbonate and any unconverted propylene oxide present) were mathematically eliminated. The weight fraction of the repeat carbonate units in the polyether carbonate polyol was converted to a proportion by weight of carbon dioxide using the factor F=44/(44+58). The figure for the $CO_2$ content in the polyether carbonate polyol ("$CO_2$ incorporated"; see examples which follow and table 1) is normalized to the polyether carbonate polyol molecule which has formed in the copolymerization and the activation steps.

The amount of cyclic propylene carbonate formed is determined via the mass balance of the total amount of cyclic propylene carbonate present in the reaction mixture and the amount of propylene carbonate optionally used as the initial charge.

Example 1: Preparation of Polyether Carbonate Polyol with Addition of $H_3PO_4$

Step (α):

A 300 ml pressure reactor equipped with a sparging stirrer was charged with a mixture of DMC catalyst (18 mg) and starter substance (α,ω-dihydroxypolypropylene oxide; OH number=260 mg KOH/g; 21.75 g) and the suspension was stirred (800 rpm) at 130° C. for 30 minutes under a partial vacuum (50 mbar), with argon being passed through the mixture.

Step (β):

15 bar of $CO_2$ were then applied to the suspension, in the course of which a slight drop in temperature was observed. On reattainment of a temperature of 130° C., propylene oxide (PO, 2.2 g) were metered in using an HPLC pump (3 ml/min). Onset of polymerisation of PO was signaled by a temperature increase and by a pressure drop (based on the starting pressure after addition of PO). After the first pressure drop two further additions of PO were conducted (2.2 g; 3 ml/min).

Step (γ):

The reaction mixture was cooled to 100° C. and, during step (γ), the pressure in the pressure reactor was kept at 15 bar by metered addition of further $CO_2$ with the aid of a mass flow regulator. Propylene oxide (68 g) was metered in via an HPLC pump (1 ml/min) with stirring (800 rpm). The progress of the reaction was monitored using in situ IR spectroscopy. The PO concentration at this juncture was 84.5 g/l.

Step (δ):

After the addition of PO had been terminated, stirring was continued at 100° C. and reaction pressure (15 bar) for a further 45 min (800 rpm). The PO concentration had fallen to 8.8 g/l at this juncture. Subsequently, component K (0.01 g $H_3PO_4$) dissolved in triethyl phosphate ($(EtO)_3PO$, 5.35 g) was metered into the reaction mixture and the reaction mixture was stirred at 100° C. for a further 12 h. Monitoring of the reaction using in situ IR spectroscopy was continued during this time. After 12 h hours the reaction was terminated by cooling the pressure reactor in an ice bath, releasing the positive pressure and analyzing the resulting product. The $CO_2$ proportion incorporated in the polyether carbonate polyol and the ratio of cyclic to linear carbonate were determined by means of $^1H$ NMR spectroscopy.

| | |
|---|---|
| PO concentration 45 min after termination of PO addition during addition of component K: | 8.8 g/l |
| Proportion of incorporated $CO_2$: | 10.2% by weight |
| e/f: | 0.18 |
| g/e: | 0.11 |

Example 2 (Comparative): Preparation of Polyether Carbonate Polyol without Addition of $H_3PO_4$ Step ($\alpha$):

A 300 ml pressure reactor equipped with a sparging stirrer was charged with a mixture of DMC catalyst (18 mg) and starter substance ($\alpha$,$\omega$-dihydroxypolypropylene oxide; OH number=260 mg KOH/g; 21.75 g) and the suspension was stirred (800 rpm) at 130° C. for 30 minutes under a partial vacuum (50 mbar), with argon being passed through the mixture.

Step ($\beta$):

15 bar of $CO_2$ were then applied to the suspension, in the course of which a slight drop in temperature was observed. On reattainment of a temperature of 130° C., propylene oxide (PO, 2.2 g) were metered in using an HPLC pump (3 ml/min). Onset of polymerisation of PO was signaled by a temperature increase and by a pressure drop (based on the starting pressure after addition of PO). After the first pressure drop two further additions of PO were conducted (2.2 g; 3 ml/min).

Step ($\gamma$):

The reaction mixture was cooled to 100° C. and, during the subsequent steps, the pressure in the pressure reactor was kept at 15 bar by metered addition of further $CO_2$ with the aid of a mass flow regulator. Propylene oxide (68 g) was metered in via an HPLC pump (1 ml/min) with stirring (800 rpm). The progress of the reaction was monitored using in situ IR spectroscopy.

Step ($\delta$):

After the addition of PO had been terminated, stirring was continued at 100° C. and reaction pressure (15 bar) for a further 45 min (800 rpm). The PO concentration had fallen to 8.8 g/l at this juncture. The reaction mixture was subsequently stirred at 100° C. for a further 12 h. Monitoring of the reaction using in situ IR spectroscopy was continued during this time. After 12 h hours the reaction was terminated by cooling the pressure reactor in an ice bath, releasing the positive pressure and analyzing the resulting product. The $CO_2$ proportion incorporated in the polyether carbonate polyol and the ratio of cyclic to linear carbonate were determined by means of $^1H$ NMR spectroscopy.

| | |
|---|---|
| PO concentration 45 min after termination of PO addition: | 8.8 g/l |
| Proportion of incorporated $CO_2$: | 10.1% by weight |
| e/f: | 0.17 |
| g/e: | 0.16 |

Example 3 (Comparative): Preparation of Polyether Carbonate Polyol with Addition of ($(EtO)_3PO$)

Step ($\alpha$):

A 300 ml pressure reactor equipped with a sparging stirrer was charged with a mixture of DMC catalyst (18 mg) and starter substance ($\alpha$,$\omega$-dihydroxypolypropylene oxide; OH number=260 mg KOH/g; 21.75 g) and the suspension was stirred (800 rpm) at 130° C. for 30 minutes under a partial vacuum (50 mbar), with argon being passed through the mixture.

Step ($\beta$):

15 bar of $CO_2$ were then applied to the suspension, in the course of which a slight drop in temperature was observed. On reattainment of a temperature of 130° C., propylene oxide (PO, 2.2 g) were metered in using an HPLC pump (3 ml/min). Onset of polymerisation of PO was signaled by a temperature increase and by a pressure drop (based on the starting pressure after addition of PO). After the first pressure drop two further additions of PO were conducted (2.2 g; 3 ml/min).

Step ($\gamma$):

The reaction mixture was cooled to 100° C. and, during the subsequent steps, the pressure in the pressure reactor was kept at 15 bar by metered addition of further $CO_2$ with the aid of a mass flow regulator. Propylene oxide (68 g) was metered in via an HPLC pump (1 ml/min) with stirring (800 rpm). The progress of the reaction was monitored using in situ IR spectroscopy.

Step ($\delta$):

After the addition of PO had been terminated, stirring was continued at 100° C. and reaction pressure (15 bar) for a further 45 min (800 rpm). The PO concentration had fallen to 8.8 g/l at this juncture. Subsequently, $(EtO)_3PO$ (5.35 g) was metered into the reaction mixture and the reaction mixture was stirred at 100° C. for a further 12 h. Monitoring of the reaction using in situ IR spectroscopy was continued during this time. After 12 h hours the reaction was terminated by cooling the pressure reactor in an ice bath, releasing the positive pressure and analyzing the resulting product. The $CO_2$ proportion incorporated in the polyether carbonate polyol and the ratio of cyclic to linear carbonate were determined by means of $^1H$ NMR spectroscopy.

| | |
|---|---|
| PO concentration 45 min after termination of PO addition: | 8.8 g/l |
| Proportion of incorporated $CO_2$: | 10.0% by weight |
| e/f: | 0.17 |
| g/e: | 0.15 |

Example 4 (Comparative): Preparation of Polyether Carbonate Polyol with Addition of $H_3PO_4$ and $(EtO)_3PO$ in Step ($\alpha$)

Step ($\alpha$):

A 300 ml pressure reactor equipped with a sparging stirrer was charged with a mixture of DMC catalyst (18 mg), starter substance ($\alpha$,$\omega$-dihydroxypolypropylene oxide; 435 g/mol; 21.75 g) and component K (0.01 g $H_3PO_4$) dissolved in triethyl phosphate ($(EtO)_3PO$, 5.35 g) and the suspension was stirred (800 rpm) at 130° C. for 30 minutes under a partial vacuum (50 mbar), with argon being passed through the mixture.

Step ($\beta$):

15 bar of $CO_2$ were then applied to the suspension, in the course of which a slight drop in temperature was observed. On reattainment of a temperature of 130° C., propylene oxide (PO, 2.2 g) were metered in using an HPLC pump (3 ml/min). Neither a temperature increase nor a pressure drop (based on the starting pressure after addition of PO) were observed. In situ IR spectroscopy showed an increase in the concentration of propylene oxide during Step ($\beta$). The elevated concentration of propylene oxide was observed even after 2 h. No conversion of propylene oxide (no reaction) took place.

TABLE 1

Summary of the results

| Example | Point in time of component K addition | Amount of component K (H$_3$PO$_4$) [ppm] $^{a)}$ | cyclic/linear carbonate ratio [g/e] | Proportion of incorporated CO$_2$ [wt %] |
|---|---|---|---|---|
| 1 | In step (δ): 45 min after termination of PO addition at [PO] = 8.8 g/l | 100 | 0.11 | 10.2 |
| 2 (comp.) | — | | 0 | 0.16 | 10.1 |
| 3 (comp.) | — | | 0 | 0.15 | 10.0 |
| 4 (comp.) | In step (α) | 100 | No reaction | |

$^{a)}$ Reported amount of component K is relates to content (ppm) in reaction mixture.
[PO] Concentration of propylene oxide
Comp. = comparative example A comparison of the results from example 1 and comparative example 2 shows that in the case of inventive addition of H$_3$PO$_4$, a lower ratio of cyclic propylene carbonate to linear carbonate is obtained at comparable CO$_2$ content of the obtained polyether carbonate polyol (Example 1) than without addition of component K (Comparative Example 2). Comparative example 3 shows that the addition of (EtO)$_3$PO has no effect on the formation of cyclic propylene carbonate. Comparative example 4 shows that in the case of addition of component K in the drying step (Step (α)) the DMC catalyst shows no activity in the copolymerization.

The invention claimed is:

1. A process for preparing polyether carbonate polyols comprising copolymerizing alkylene oxides and carbon dioxide onto H-functional starter substance in the presence of a catalyst, wherein the process comprises
    (γ) adding alkylene oxide and carbon dioxide onto a H-functional starter substance in a reactor in the presence of a double metal cyanide catalyst, to obtain a reaction mixture comprising the polyether carbonate polyol,
    and
    (δ) reducing the content of free alkylene oxide in the reaction mixture obtained in (γ) by way of a postreaction, wherein the reaction mixture remains in the reactor or is continuously transferred into a postreactor, during the postreaction a component K is added, wherein component K comprises at least one compound containing a phosphorus-oxygen-hydrogen group.

2. The process as claimed in claim 1, wherein component K is added during the postreaction at a content of free alkylene oxide of 0.1 g/l to 10 g/l.

3. The process as claimed in claim 1, wherein component K is employed during the postreaction in an amount of 5 ppm to 1000 ppm, based on the reaction mixture comprising the polyether carbonate polyol obtained in (γ).

4. The process as claimed in claim 1, additionally comprising
    (β) activating the DMC catalyst by adding a portion (based on the total amount of alkylene oxides used in the activation and copolymerization) of alkylene oxide to a mixture of H-functional starter substance and DMC catalyst or to a mixture of suspension medium and the DMC catalyst, wherein this addition of the portion of alkylene oxide may optionally be effected in the presence of CO$_2$, and in each case awaiting the hotspot, which occurs due to the subsequent exothermic chemical reaction, and/or a pressure drop in the reactor and, optionally, repeating said activation (β), prior to (γ).

5. The process as claimed in claim 1, additionally comprising a first step
    (α) initially charging the H-functional starter substance or a suspension medium, and removing any water, other volatile compounds or combinations thereof by elevated temperature and/or reduced pressure ("drying"), wherein the DMC catalyst is added to the H-functional starter substance or to the suspension medium before or after the drying.

6. The process as claimed in claim 1, wherein in step (γ) said addition comprises continuously metering alkylene oxide, H-functional starter substance and DMC catalyst into the reactor in the presence of carbon dioxide, followed by continuously removing the resulting reaction mixture from the reactor.

7. The process as claimed in claim 1, wherein component K comprises at least one compound selected from the group consisting of phosphoric acid, mono- and dialkyl esters of phosphoric acid, mono- and diaryl esters of phosphoric acid, mono- and dialkaryl esters of phosphoric acid, (NH$_4$)$_2$HPO$_4$, phosphonic acid, monoalkyl esters of phosphonic acid, monoaryl esters of phosphonic acid, monoalkaryl esters of phosphonic acid, phosphorous acid, mono- and dialkyl esters of phosphorous acid, mono- and diaryl esters of phosphorous acid, mono- and dialkaryl esters of phosphorous acid and phosphinic acid.

8. The process as claimed in claim 1, wherein component K comprises at least one compound selected from the group consisting of phosphoric acid, phosphonic acid and phosphinic acid.

9. The process as claimed in claim 1, wherein component K comprises phosphoric acid.

10. The process as claimed in claim 1, wherein the H-functional starter substance comprises at least one compound selected from the group consisting of ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, octane-1,8-diol, diethylene glycol, dipropylene glycol, glycerol, trimethylolpropane, pentaerythritol, sorbitol, polyether carbonate polyols having a molecular weight Mn in the range from 150 to 8000 g/mol with a functionality of 2 to 3 and polyether polyols having a molecular weight Mn in the range from 150 to 8000 g/mol with a functionality of 2 to 3.

11. The process as claimed in claim 1, wherein in (δ) the postreactor comprises a tubular reactor.

12. The process as claimed in claim 11, wherein in (δ) metered addition of component K is effected in the second half of the route that the reaction mixture traverses in the tubular reactor.

13. The process as claimed in claim 1, wherein in (δ) the content of free alkylene oxide is reduced to less than 0.5 g/l in the reaction mixture by way of a postreaction.

14. The process as claimed in claim 1, wherein component K is employed during the postreaction in an amount of 10 ppm to 500 ppm, based on the reaction mixture obtained in (γ).

15. The process as claimed in claim 1, wherein component K is employed during the postreaction in an amount of 20 ppm to 200 ppm, based on the reaction mixture obtained in (γ).

* * * * *